United States Patent [19]

Yamaguchi et al.

[11] Patent Number: 4,783,894

[45] Date of Patent: Nov. 15, 1988

[54] LOCK PLATES INSERTING MACHINE AND METHOD OF INSERTING SAID LOCK PLATES FOR A KEY CYLINDER

[75] Inventors: Terumoto Yamaguchi, Anjo; Akira Kominami, Nishikasugai, both of Japan

[73] Assignee: Kabushiki Kaisha Tokai Rika Denki Seisakusho, Aichi, Japan

[21] Appl. No.: 898,107

[22] Filed: Aug. 20, 1986

[30] Foreign Application Priority Data

Aug. 20, 1985 [JP] Japan .............................. 60-183624

[51] Int. Cl.[4] ........................ B23P 15/00; E05B 29/00

[52] U.S. Cl. ........................................ 29/434; 29/445; 29/709; 29/714

[58] Field of Search ............... 29/428, 434, 445, 33 K, 29/700, 705, 709, 714

[56] References Cited

U.S. PATENT DOCUMENTS

| | | | |
|---|---|---|---|
| 1,850,323 | 3/1932 | Heyer | 29/445 X |
| 1,979,939 | 11/1934 | Jacobi | 29/445 X |
| 3,002,268 | 10/1961 | Spain | 29/445 X |
| 3,226,811 | 1/1966 | Roland | 29/709 X |
| 4,133,093 | 1/1979 | Pusa et al. | 29/434 |

*Primary Examiner*—Howard N. Goldberg
*Assistant Examiner*—Taylor J. Ross
*Attorney, Agent, or Firm*—Birch, Stewart, Kolasch & Birch

[57] ABSTRACT

A lock plates inserting machine and a method of automatically and mechanically inserting a plurality of lock plates into corresponding openings defined in the key cylinder. The lock plates inserting machine includes a key holder having a plurality of grooves corresponding to respective serrations of a key to be inserted. At least one key serrations detecting member having a key serrations detecting convex portion is inserted into one of the grooves of the key holder. At least one slide member is slidable upon pivotal movement of the key serrations detecting member and upon concave portions equal in number to the different sizes of the key serrations. A plurality of first push members corresponding to respective concave portions of the slide member are positioned so that a proper one of the first push members is inserted into its corresponding concave portion of the slide member in accordance with the slide members's position. A plurality of lock plates support members are provided for supporting lock plates of different sizes. An elevating member sequentially receives the lock plates into grooves defined on it, and a plurality of second push members are provided for inserting the lock plates placed in regular order in the elevating member into the openings of the key cylinder.

5 Claims, 6 Drawing Sheets

LOCK PLATES INSERTING MACHINE AND METHOD OF INSERTING SAID LOCK PLATES FOR A KEY CYLINDER

BACKGROUND OF THE INVENTION

The present invention generally relates to a lock plates inserting machine for key cylinder and a method for inserting lock plates into a key cylinder. More specifically, the present invention concerns the method and machine for automatically and mechanically inserting the lock plates into a plurality of respective lock plate receiving openings defined at regular intervals on the key cylinder in the axial direction thereof, in combination with such an operation that the required lock plates to be inserted are mechanically detected so as to correspond to respective serrations of a key.

In a well-known key cylinder, as shown in FIG. 1, a plurality of spaced serrations 2 having different widths are formed in parallel with each other on a key 1 in the longitudinal direction thereof and as many spaced lock plate receiving openings 4 as the key serrations 2 are defined on a key cylinder 3 in the axial direction thereof at the positions corresponding to the serrations 2 of the key 1 to be inserted. Since a plurality of lock plates 5 are inserted through springs 6 into the lock plate receiving openings 4 so as to correspond to the widths of respective key serrations 2, various kinds of key cylinders are produced by changing the arrangement of the key serrations 2.

Conventionally, although the springs 6 are automatically inserted into the lock plate receiving openings 4 of the key cylinder 3, the work for inserting the lock plates 5 corresponding to the key serrations 2 into respective lock plate receiving openings 4 of the key cylinder 3 is generally carried out through such a handwork that upon eye-measurement of the key serrations 2 by a worker, the lock plates 5 corresponding to respective key serrations 2 are inserted into the lock plate receiving openings 4 of the key cylinder 3 by being manually picked up. The foregoing work has been repeated six times by the worker owing to the fact that the key 1 generally has six rows of the serrations 2.

According to the above described handwork, however, not only the worker is required to be superior in skill and occasionally makes a mistake in measuring the key serrations 2 with his eyes, but also there exist considerable individual differences. Furthermore, on account of the handwork, it takes approximately thirteen seconds for the worker to insert all of the lock plates into one key cylinder, even in the fastest work by a skilled worker. Such being the circumstances, the aforementioned handwork is inferior in working efficiency, and as a result, the key cylinders have been undesirably produced at high cost.

Recently, there has been developed an electrically driven automatic inserting machine for automatically inserting the lock plates into the lock plate receiving openings of the key cylinder corresponding thereto in accordance with a result obtained by electrically detecting the key serrations one by one, through an optical sensor. However, the aforementioned electrically driven inserting machine includes such drawbacks that it is extremely complicated in construction and is formed into a large size and furthermore, it is unsuitable for incorporation into a production line, thus resulting in that the key cylinders have been produced at high cost. In addition, since the inserting machine of the above described type further includes such problems that it can not easily deal with the cases where a faulty detection of the key serrations, faulty insertion of the lock plates or the like has taken place and it can not be easily repaired in case of accident, it has a drawback that it has not been suitable for practical use.

SUMMARY OF THE INVENTION

Accordingly, the present invention has been developed with a view to substantially eliminating the above described disadvantages inherent in the conventional handwork or in the prior art inserting machine, and has for its essential object to provide an improved and substantially mechanically driven automatic inserting machine of small size which is capable of being readily incorporated into a production line and manufactured at low cost.

Another important object of the present invention is to provide an automatic inserting machine of the above described type which can be easily handled in case of its malfunction and can be readily repaired in case of accident.

A further object of the present invention is to provide a method for mechanically inserting lock plates into a key cylinder, which substantially eliminates a troublesome and time consuming handwork by a worker.

In accomplishing these and other objects, according to one preferred embodiment of the present invention, there is provided a lock plates inserting machine which is capable of mechanically detecting serrations of a key and automatically mechanically inserting the lock plates into respective appointed lock plates receiving openings defined on the key cylinder in organic combination with the aforementioned detection of the key serrations.

More specifically, the present invention is characterized in that in a lock plates inserting machine for key cylinder for inserting the lock plates corresponding to respective key serrations into a plurality of lock plate receiving openings defined at regular intervals on the key cylinder in the axial direction thereof, said lock plates inserting machine includes a key holder having a plurality of grooves defined thereon and corresponding to respective serrations of the key to be inserted, at least one key serrations detecting member having one end freely pivotally mounted on a fulcrum disposed on a base and a key serrations detecting convex portion in the vicinity of the fulcrum, while resiliently urged by a spring for inserting the key serrations detecting convex portion into either of the grooves of the key holder, at least one slide member disposed on the base slidably together with pivotal movement of the key serrations detecting member and having as many concave portions as the kinds of sizes of the key serrations defined at regular intervals thereon in its sliding direction, with slide amount of the slide member varying in accordance with the sizes of the key serrations, a plurality of first push members, corresponding to respective concave portions of the slide member, resiliently urged by a spring and positioned so that either one of the first push members is inserted into its corresponding concave portion of the slide member in accordance with the slide amount thereof, a plurality of lock plates support members securely mounted on the base at the positions respectively corresponding to the first push members for supporting thereon the lock plates of different sizes, an elevating member having a plurality of lock plate receiving grooves corresponding to the lock plate receiving openings of the key cylinder, while the lock plates pushed out by the first push members are sequentially inserted into the lock plate receiving grooves, and a plurality of second push members operated by a drive means and inserted into respective lock plate receiving grooves of the elevating member from one end thereof for inserting the lock plates placed in regular order in the lock plates receiving grooves into the lock plate receiving openings of the key cylinder disposed in the vicinity of the other end thereof.

Moreover, in another aspect of the present invention, there is provided a method of inserting the lock plates for key cylinder, wherein the lock plates respectively corresponding to the key serrations are inserted into a plurality of lock plate receiving openings defined at regular intervals on the key cylinder in the axial direction thereof. The method includes the steps of inserting the key into a key holder, inserting a key serrations detecting convex portion formed on the key serrations detecting member urged by a spring into one of grooves defined on the key holder for detecting the key serrations so as to operate the key serrations detecting member in accordance with the size of one of the key serrations, sliding a slide member together with operation of the key serrations detecting member, inserting one of push members corresponding to the size of the key serration into either one corresponding thereto of a plurality of concave portions formed on the slide member, with push members being urged by respective springs and so disposed as to correspond to respective concave portions of the slide member, pushing out one of the lock plates corresponding to the size of the key serration by one of the push members, with said lock plates being supported by one of support members, inserting the lock plate into one of a plurality of grooves defined on an elevating member and corresponding to as many lock plate receiving openings defined on the key cylinder, inserting required lock plates into respective grooves of the elevating member in accordance with the sizes and alignment of the key serrations by repeating aforementioned operation, and inserting required lock plates into corresponding lock plate receiving openings of the key cylinder disposed on one end of the elevating member by simultaneously inserting a plurality of second push members into respective grooves of the elevating member from the other end thereof so as to advance the lock plates together with the second push members within the elevating member.

BRIEF DESCRIPTION OF THE DRAWINGS

These and other objects and features of the present invention will become apparent from the following description taken in conjunction with the preferred embodiment thereof with reference to the accompanying drawings, throughout which like parts are designated by like reference numerals, and in which.

Figure 3:
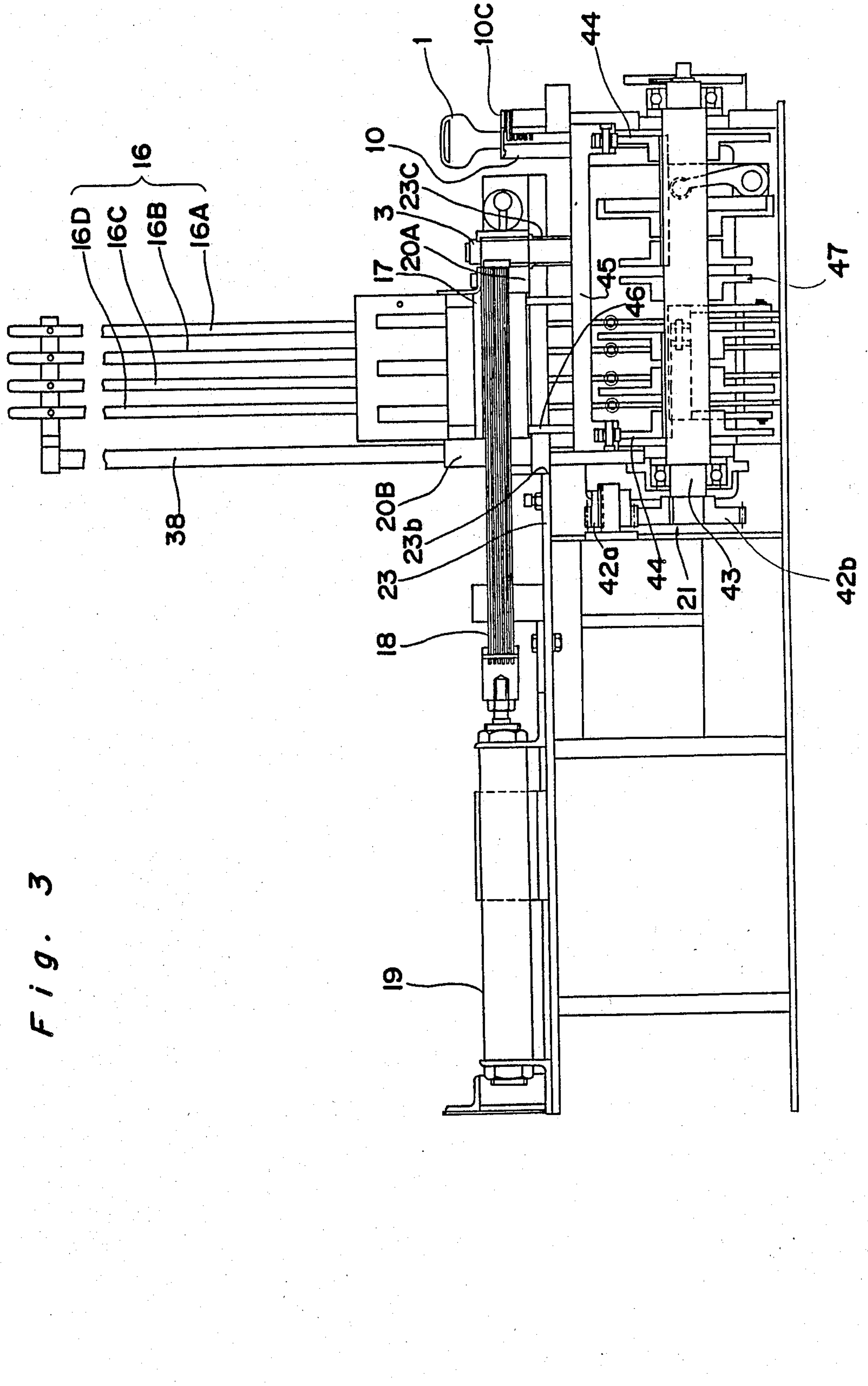
FIG. 3 is a front elevational view of a lock plates inserting machine according to the present invention.
Figure 7:
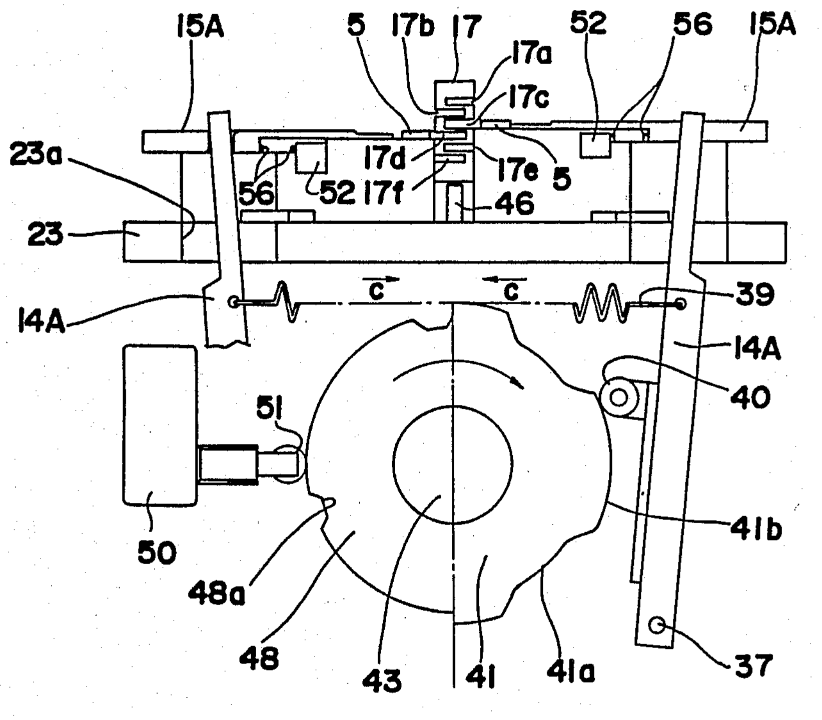
Figure 8:
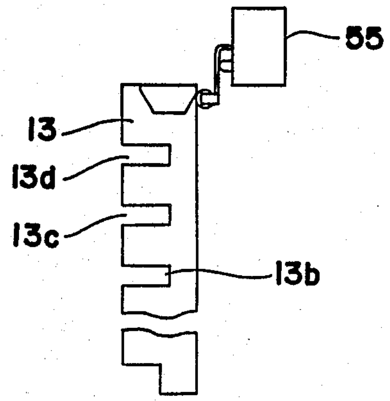

FIG. *6a* is a fragmentary plan view, on an enlarged scale, showing the relationship between concave portions of a slide comb and push levers, both of which are employed in the present invention;

FIGS. *6b* through *6e* are fragmentary plan views, on an enlarged scale, each showing the relationship between a travelling amount of the slide comb and one of the push levers inserted into the corresponding concave portion of the slide comb;

FIG. 7 is a side elevational view, on an enlarged scale, of an elevating mechanism employed in the present invention for moving an elevator upwardly and downwardly; and FIG. 8 is a top plan view showing the relationship between the slide comb and a limit switch for desirably operating the lock plate inserting machine of FIG. 3.

DETAILED DESCRIPTION OF THE INVENTION

Figure 1:
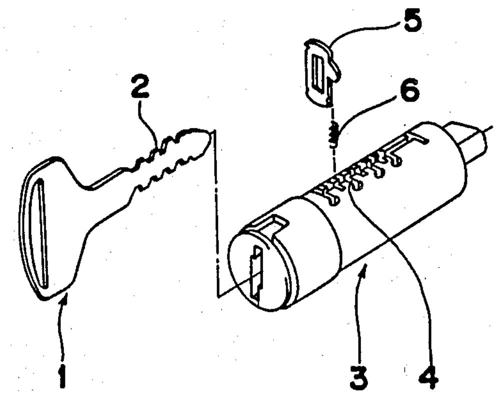
Fig. 1 PRIOR ART
FIG. 1 is an exploded perspective view of a conventional key cylinder (already referred to)
Figure 2:
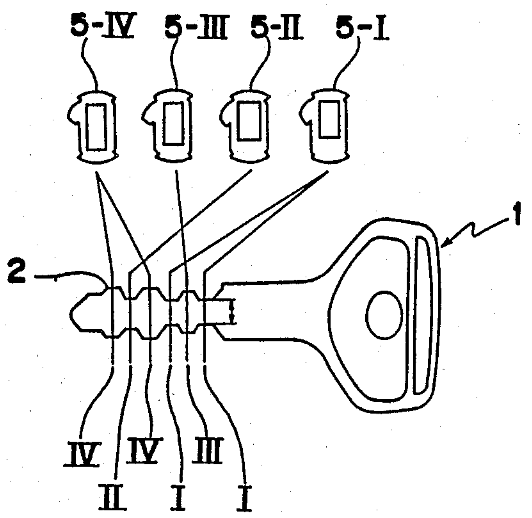
FIG. 2 is an exploded view showing the relationship between serrations of a key and lock plates, both of which are used in a preferred embodiment of the present invention.

Referring now to the drawings, there is shown in FIG. 2, a key 1 having six rows of serrations of four different widths, to which the present invention is applied. The widths of the key serrations No. I, II, III and IV are 4 mm, 5 mm, 6 mm and 7 mm respectively, that is, there are differences by 1 mm each in whole width and by 0.5 mm each in half width among the serrations No. I to IV. Lock plates 5 (5-I, 5-II, 5-III and 5-IV) corresponding to respective key serrations No. I to IV are inserted through springs 6 into lock plate receiving openings 4 defined at regular intervals of 2.5 mm on a key cylinder 3 in the axial direction thereof. The springs 6 are inserted in advance into the lock plate receiving openings 4 by an automatic inserting device (not shown) before the process for inserting the lock plates 5.

Figure 4:
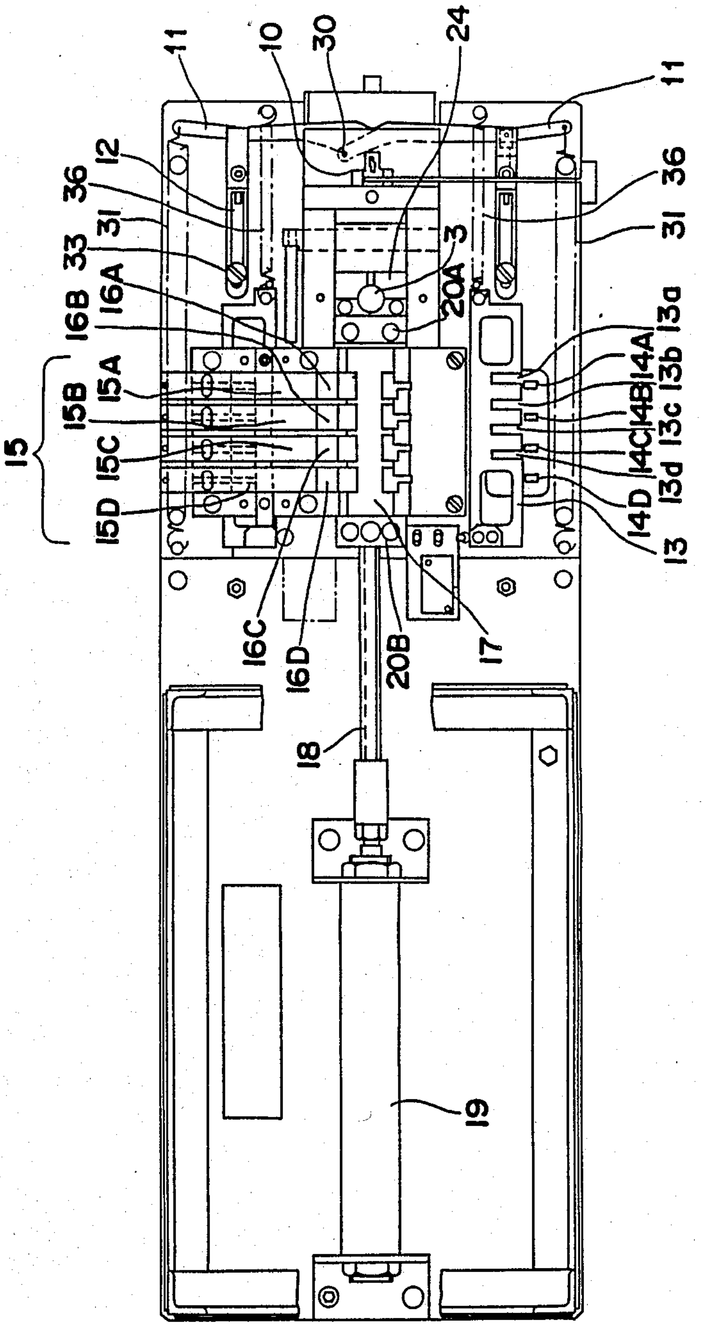
FIG. 4 is a top plan view of FIG. 3.
Figure 5:
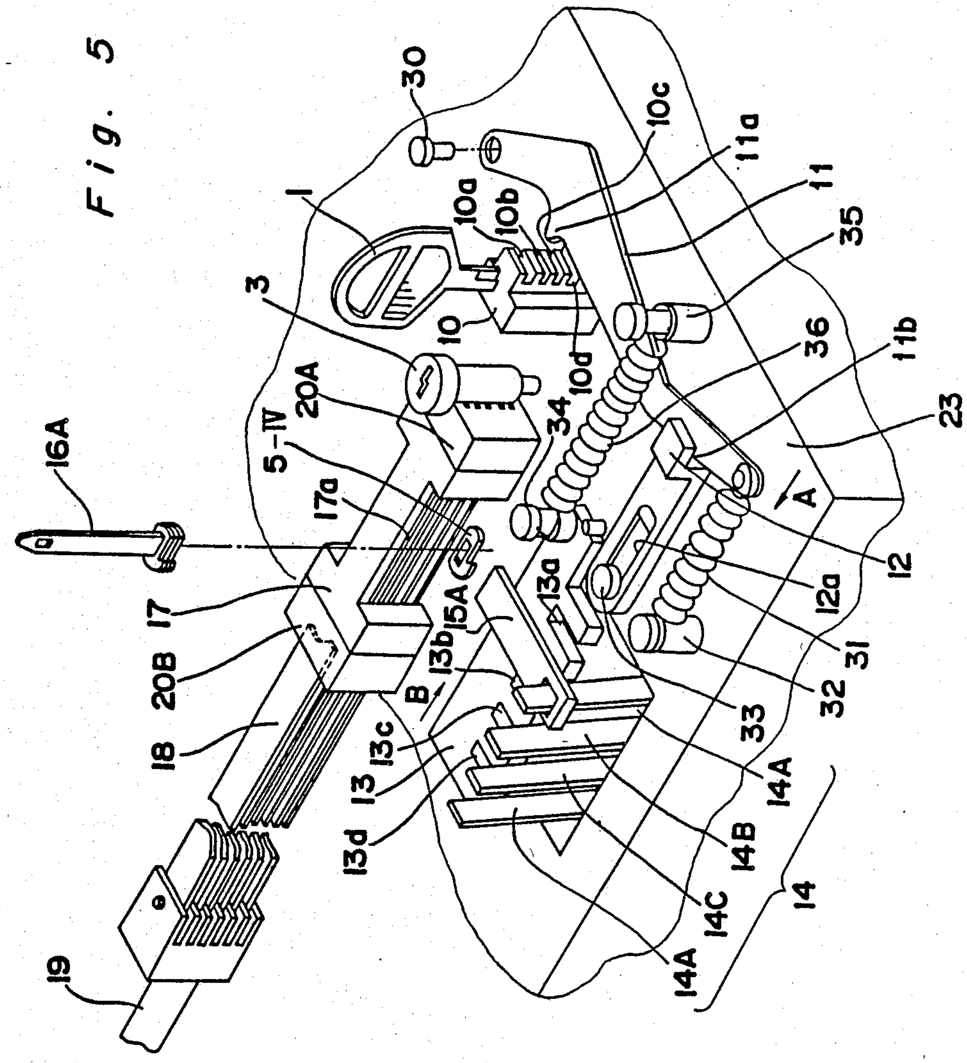
FIG. 5 is a fragmentary perspective view of a main portion of FIG. 3.

In FIGS. 3 through 5, there is shown a lock plates inserting machine according to one preferred embodiment of the present invention, which is provided with a key holder 10 for receiving the key 1 to be detected thereinto, a pair of key serrations detecting levers 11 for detecting the serrations 2 of the key 1 inserted into the key holder 10, a pair of slide bars 12 movable together with respective key serrations detecting levers 11, a pair of slide combs 13 each having a shape similar to the teeth of a comb and movable together with respective slide bars 12, a pair of push lever units 14 each of which includes four pieces of puch levers 14A to 14D respectively inserted into four concave portions **13*a* to 13*d* defined on one side of the slide comb 13 in compliance with a travelling distance thereof, a pair of push plate units 15 each of which includes four pieces of first push plates 15A to 15D connected to respective push levers 14A to 14D at one ends thereof, a pair of lock plates holding bar units 16 each of which includes four pieces of lock plates holding bars 16A to 16D so disposed as to correspond to the positions where tips of the first push plates 15A to 15D are located for holding a large number of respective lock plates 5-IV to 5-I piled one upon another thereon, an elevator 17 for receiving the lock plates 5-I to 5-IV pushed thereinto by the first push plates 15A to 15D, six pieces of second push plates 18 for pushing the lock plates 5 placed within the elevator 17 into the lock plate receiving openings 4 of the key cylinder 3, an air cylinder 19 for pushing the second push plates 18, a pair of guide plates 20A and 20B disposed on opposite ends of the elevator 17, a base 23 and a cam mechanism 21 for vertically moving the key holder 10 together with the elevator 17**.

The elevator 17 is so disposed at the center of the base 23 as to be freely movable in three steps in the vertical direction by a cam mechanism which is explained in detail hereinafter and a pair of guide plates 20A and 20B are fixedly mounted on the base 23 on opposite ends of the elevator 17. Furthermore, a jig 24 suitable for the key cylinder 3 into which the lock plates 5 are inserted is placed in position immediately before the front guide plate 20A and the key holder 10 corresponding to the key 1 is set in front of the jig 24 so that the key holder 10 is capable of moving up and down together with the elevator 17 by the cam mechanism 21. The second push plates 18 are disposed at the back of the rear guide plate 20B so as to be moved back and forth by the air cylinder 19. Pairs of the slide combs 13, push lever units 14, push plate units 15 and lock plates holding bar units 16 are symmetrically disposed on respective sides of the elevator 17 and likewise, not only a pair of the key serrations detecting levers 11 but also a pair of slide bars 12 capable of sliding in combination therewith for sliding respective slide combs 13 are also symmetrically disposed in front of the key holder 10 and on both sides thereof respectively.

By the above described construction, upon detection of two of the upper and lower adjacent serrations 2 of the key 1 set vertically at a time, two of the required lock plates 5 are simultaneously inserted, through the slide bars 12, slide combs 13, push levers 14A to 14D and first push plates 15A to 15D from both sides of the elevator 17 into two of lock plate receiving grooves 17a to 17f which are defined vertically in six stages on the elevator 17. Thereafter, both of the key holder 10 and the elevator 17 are moved upward or downward in three steps and upon repetition of the aforementioned operation three times, each one of six required lock plates 5 is inserted into each of six staged lock plate receiving grooves 17a to 17f of the elevator 17 and subsequently, all of the lock plates 5 are inserted into respective lock plate receiving openings 4 defined on the key cylinder 3 at one time, in a manner that the lock plates 5 placed in the lock plate receiving grooves 17a to 17f are simultaneously pushed out by the second push plates 18.

In the next place, the construction and function of each member will be explained in detail hereinafter.

The key holder 10 is provided with six stages of key serrations detecting grooves 10a to 10f vertically defined thereon at regular intervals of 2.5 mm so that each of the grooves 10a to 10f is formed at the position corresponding to each one of the serrations 2 of the key 1 to be inserted.

Each of the pair of key serrations detecting levers 11 arranged on both sides and in front of the key holder 10 has one end freely pivotally mounted on a fulcrum 30 disposed on the base 23 and the other end securely connected to one end of a spring 31 for urging the key serrations detecting lever 11 towards the direction indicated by the arrow A in FIG. 5 by holding the other end thereof on a first spring holder 32 projecting upwards on the base 23. Each key serrations detecting lever 11 is provided with a convex portion 11a formed in the vicinity of the fulcrum 30 for being inserted into the grooves 10a to 10f of the key holder 10 and a slide bar contact portion 11b formed in the vicinity of a connecting portion between the other end thereof and the spring 31, and is so designed that a distance between the fulcrum 30 and the convex portion 11a and a distance between the former and the slide bar contact portion 11b is in the ratio of one to six. The convex portion 11a of the key serrations detecting lever 11 varies in its insertion amount into one of the grooves 10a to 10f of the key holder 10 in accordance with the widths of the key serrations 2, that is, since the insertion amount of the convex portion 11a is small in the case where the key serration No. IV having a broader width gets in contact therewith, the slide bar contact portion 11b travels towards the direction indicated by the arrow A in a small amount but on the contrary, since the insertion amount of the convex portion 11a is large in the case where the key serration No. I having a narrower width gets in contact therewith, the slide bar contact portion 11b travels in a large amount.

Each slide bar 12 is provided with a front end in contact with the slide bar contact portion 11b of the key serrations detecting lever 11 and a rear end having an elongated guide opening 12a in the longitudinal direction thereof. Furthermore, the slide bar 12 is freely reciprocable along a guide pin 33 which is projected upwards on the base 23 and held in the guide opening 12a of the slide bar 12, with the rear end surface thereof getting in contact with the slide comb 13. A spring 36 is arranged between a second spring holder 34 disposed on the front end of the slide comb 13 and a third spring holder 35 disposed on the base 23 for urging both the slide comb 13 and the slide bar 12 frontwards towards the direction indicated by the arrow B.

The aforementioned slide bar 12 and slide comb 13 slide backwards in compliance with the movement of the key serrations detecting lever 11 and at this moment, they are controlled by the movement which magnifies the difference of the key serrations 2 by six times in terms of the relationship of the aforementioned ratio of the key serrations detecting lever 11 of one to six. More specifically, since the difference of the key serrations No. III and No. IV is 0.5 mm in half width to be detected, the difference of the travelling amount of the slide comb 13 is $0.5\text{ mm}\times6=3\text{ mm}$, and likewise, that of the key serrations No. II and No. IV is $1\text{ mm}\times6=6\text{ mm}$ and that of the key serrations No. I and IV is $1.5\text{ mm}\times6=9\text{ mm}$.

Figure 6A:
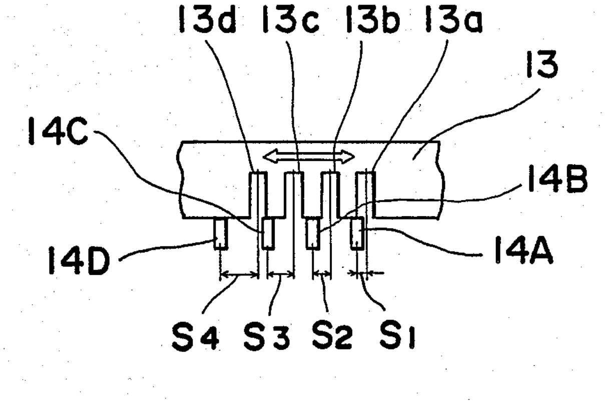
Figure 6B:
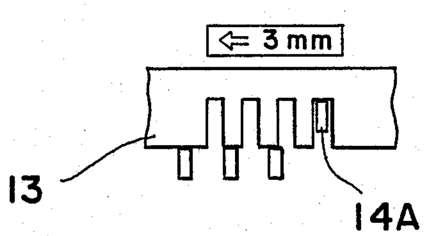
Figure 6C:
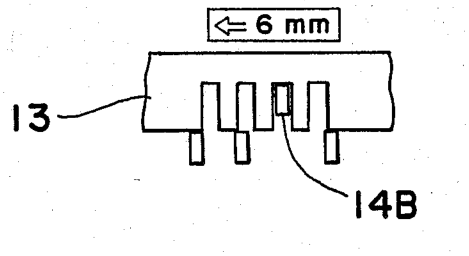
Figure 6D:
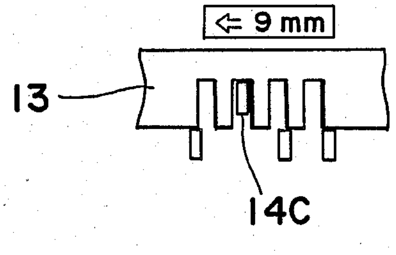
Figure 6E:
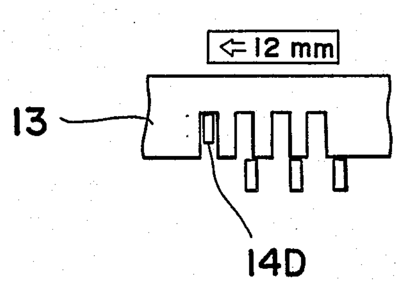

As shown in FIG. 6a, four concave portions 13a to 13d are formed on each slide comb 13 at regular intervals and the push levers 14A to 14D to be inserted thereinto in compliance with the travelling amounts thereof are positioned by employing a vernier means utilized in such a measuring tool as slide caliper or the like in consideration of the aforementioned difference of the travelling amounts. In other words, as shown in FIGS. 6b through 6e, since the slide comb 13 is caused to stop at either of four positions respectively located 3 mm, 6 mm, 9 mm and 12 mm away from its frontmost position at intervals of 3 mm each, a distance S1 between the center of the frontmost concave portion 13a and that of the push lever 14A, a distance S2 between the center of the concave portion 13b and that of the push lever 14B, a distance S3 between the center of the concave portion 13c and that of the push lever 14C, and a distance S4 between the center of the rearmost concave portion 13d and that of the push lever 14D are 3 mm, 6 mm, 9 mm and 12 mm respectively by adding 3 mm each. Accordingly, for example, when the key serration No. IV is detected, upon movement of the slide comb 13 by 3 mm, only the push lever 14A completely faces the concave portion 13a with each other and is inserted thereinto, thus resulting in that only the first push plate 15A is caused to move towards the elevator 17 so as to insert one of the lock plates 5-IV corresponding to the key serration No. IV into the appointed lock plate receiving groove 17*a* in accordance with the order of the key serrations 2 within the elevator 17, with the lock plates 5-IV being supported by the lock plates holding bar 16A. In a similar manner in other cases, only one of the push levers 14A to 14D is inevitably inserted into one of the grooves 13*a* to 13*d* corresponding thereto, but not inserted into either of the other grooves.

As described above, the lock plates 5-IV to 5-I corresponding to the push levers 14A to 14D are respectively held on the lock plates holding bars 16A to 16D which are hung down from a holding frame 38 securely mounted on the base 23, and in a large number of the lock plates 5-IV to 5-I piled one upon another on respective lock plates holding bars 16A to 16D, the lowermost ones are separated therefrom so as to be capable of being pushed out by respective first push plate 15A to 15D.

As shown in FIG. 7, each of the push levers 14A to 14D protrudes downwards from the base 23 through an opening 23*a* defined thereon and has a lower end freely pivotally mounted on a fulcrum 37. Each pair of the push levers 14A to 14D arranged on both sides of the base 23 are urged inwardly towards the slide combs 13 at the upper portion thereof by a tension spring 39 connectively disposed therebetween. An inwardly protruding roller 40 is disposed at the lower portion of each push lever 14A to 14D so as to get in contact with a push cam 41 securely mounted on a cam shaft 43 of a cam mechanism 21. The push cam 41 is provided with three concave portions 41*a* defined on the periphery thereof at regular intervals and having a diameter smaller than that of other portions in order that when the rollers 40 get in contact with one of the concave portions 41*a*, the push levers 14A to 14D are allowed to move towards the direction indicated by the arrow C by the spring 39 and only one of the push levers 14A to 14D completely facing its corresponding groove 13*a* to 13*d* of the slide comb 13 is inserted thereinto. Subsequently, after one of the lock plates 5 has been inserted into the elevator 17 through the first push plate 15A to 15D, the rollers 40 come in contact with one of large diameter portions 41*b* of the push cam 41 so as to be moved outwards against the springs 39, thus resulting in that the push lever 14A to 14D inserted into its corresponding groove 13*a* to 13*d* is restored to its previous position.

As clearly indicated in FIG. 7, the elevator 17 is provided with vertically defined six stages of grooves 17*a* to 17*f* in a manner that they are caused to open towards opposite sides alternately. Two of the lock plates 5 are simultaneously inserted into adjacent two rows of the grooves 17*a* to 17*f* of the elevator 17 from opposite sides thereof through the push plates 15A or the like so as to be placed in position in the respective grooves 17*a* to 17*f*. As these grooves 17*a* to 17*f* are penetrated in the longitudinal direction of the elevator 17, the second push plates 18 driven by the air cylinder 19 are inserted thereinto from the rear openings thereof through the guide plate 20B. The lock plates 5 are moved forwards within the grooves 17*a* to 17*f*, while pushed by the second push plates 18 and are inserted, through the guide plate 20A arranged immediately before the elevator 17, into the lock plate receiving openings 4 of the key cylinder 3 which is securely held by the jig 24.

Both of the elevator 17 and the key holder 10 are set to be freely movable in three steps in a vertical direction together with openings 23*b* and 23*c* defined on the base 23. More specifically, there are arranged below the base 23, a cam shaft 43 freely rotatable by a motor (not shown) through gears 42*a* and 42*b*, an elevator cam 44 fixedly mounted on the cam shaft 43 and an elevating plate 45 freely movable up and down by the elevator cam 44. The key holder 10 is placed in position on the elevating plate 45 and the elevating plate 45 is fixedly connected to the lower surface of the elevator 17 through rods 46. The elevator cam 44 is so shaped as to move the elevating plate 45 up and down in three steps by 5 mm each during one rotation thereof.

When the elevating plate 45 is located in its uppermost position by the elevator cam 44, the key serrations detecting levers 11 are inserted into lower two of the key serrations detecting grooves 10*e* and 10*f* of the key holder 10 so as to detect the key serrations 2 and in compliance with the result detected, the required lock plates 5 are inserted into lower two of the grooves 17*e* and 17*f* of the elevator 17 through slide bars 12, slide combs 13, push levers 14A to 14D and first push plates 15A to 15D. Likewise, after the elevating plate 45 has been moved downwards in one step, upon detection of the key serrations 2 in the grooves 10*c* and 10*d* of the middle two stages of the key holder 10, the required lock plates 5 are inserted into the lock plate receiving grooves 17*c* and 17*d* of the middle two stages of the elevator 17. Lastly, the elevating plate 45 is further moved downwards in one step so as to detect the key serrations 2 in the grooves 10*a* and 10*b* of the upper two stages of the key holder 10 and thereafter, the required lock plates 5 are inserted into the lock plate receiving grooves 17*a* and 17*b* of the upper two stages of the elevator 17. The cam shaft 43 is provided with a one cycle cam 47 fixedly mounted thereon for detecting one rotation thereof and when the lock plates 5 have been completely placed in a required order within the elevator 17 during one rotation of the cam shaft 43, not only the cam shaft 43 is caused to stop its rotation through the function of the one cycle cam 47, but also the second push plates 18 are moved forwards by the air cylinder 19 as stated hereinbefore so as to automatically insert the lock plates 5 into the key cylinder 3.

The lock plates inserting machine of the present invention is further provided with a mechanism for detecting a poor insertion of the lock plates and in the case where the poor insertion is detected, the inserting machine is brought to a halt so that the lock plates 5 are manually inserted into the key cylinder 3 and thereafter, upon restarting of the inserting machine, the automatic operation thereof for automatically inserting the lock plates is caused to follow. That is, since there are arranged a timing cam 48 fixedly mounted on the cam shaft 43 for detecting the poor insertion of the lock plates 5 and a first limit switch 50 having a roller 51 protruding therefrom in the vicinity of the timing cam 48, the roller 51 engages with one of notches 48*a* defined on the periphery of the timing cam 48 in the timing when the lock plates 5 are to be inserted so that the first limit switch 50 is turned off. In the case where the first limit switch 50 is not turned off, a signal having detected the poor insertion is sent from the first limit switch 50 so as to bring the cam shaft 43 to a halt in rotation thereof. Furthermore, a stopper 52 is disposed in the vicinity of each of the first push plates 15A to 15D and is in contact therewith at the time when the lock plate 5 is inserted into the groove of the elevator 17 in position through the movement of the push plate 15 towards the elevator 17. A contact switch 56 is disposed between each stopper 52 and each push plate 15 so that the cam shaft 43 is brought to a halt in rotation thereof by a signal informing an abnormal insertion of the lock plate 5, unless the contact switch 56 is turned on.

Moreover, since the lock plates inserting machine of a present invention is designed for the key having six rows of the serrations, in case of the key having five or less rows of the serrations, an abnormal signal is sent so as to undesirably bring the inserting machine to a halt, without any detection of the key serrations. In order to avoid the aforementioned inconvenience, a second limit switch 55 is disposed in the vicinity of the slide comb 13 so as not to bring the inserting machine to a halt by a signal sent therefrom, unless the slide comb 13 travels at the timing when it ought to do.

It is to be noted that in the above described embodiment, although a pair of push lever units and the like are disposed on both sides of the elevator, it may be so modified that they are disposed only on one side of the elevator and the lock plates are inserted one by one into the grooves of the elevator.

It is also to be noted that not only each push lever may be so modified as to be integrally formed together with each first push plate, but also it may be so modified that the slide comb can be directly slid by the key serrations detecting lever, with the slide bar being omitted.

It should be further noted that in the foregoing embodiment, although both of the elevator and the key holder are so disposed as to be moved up and down by the cam mechanism, one of other suitable mechanisms may be employed for this purpose.

As is clearly seen from the foregoing description, by the lock plates inserting machine of the present invention, the serrations of the key are sequentially mechanically detected by the key serrations detecting lever so that in compliance with the result obtained, the lock plates corresponding to respective key serrations are sequentially inserted into the appointed grooves within the elevator through mechanically combined movement of the slide bar, slide comb, push levers and first push plates with the key serrations detecting lever. Subsequently, upon completion of the aforementioned process for inserting the lock plates into the elevator, since the lock plates are respectively inserted into the appointed lock plate receiving openings of the key cylinder, while pushed by the second push plates driven by the air cylinder, the following effects can be obtained.

(1) The detection of the key serrations and insertion thereof into the key cylinder are automatically carried out and six lock plates can be inserted into one key cylinder in approximately six seconds, thus resulting in the work efficiency being extremely improved by the present invention owing to the fact that it takes approximately thirteen seconds so far for the worker to manually insert the lock plates into the key cylinder.

(2) Since an unskilled person can carry out the work which fully depends on a skilled person so far and the workers can be extremely reduced in number, the key cylinders can be produced at low cost.

(3) Since none of the keys can be wrongly detected in reading out the serrations thereof, there never occurs such a mistake in assembling process as the wrong insertion of the lock plates.

(4) Since the automatic insertion of the lock plates is mechanically carried out, the lock plates inserting machine of the present invention can easily deal with the poor operation thereof and can be easily repaired in case of accident, as compared with an electrically driven inserting machine.

(5) Since the whole of the lock plates inserting machine of the present invention can be easily miniaturized, it can be not only incorporated into a production line, but also extremely reduced in production cost thereof.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A lock plates inserting machine for inserting lock plates corresponding to respective serrations of a key into a plurality of lock plate receiving openings defined at regular intervals in a key cylinder in the axial direction thereof, said lock plates inserting machine comprising:

a base, a key holder having a plurality of grooves defined therein corresponding to respective serrations of the key to be inserted;

at least one key serrations detecting member having one end freely pivotally mounted on a fulcrum disposed on said base and a key serrations detecting convex portion in the vicinity of said fulcrum, a spring resiliently urging said at least one key serrations detecting member in a direction to insert said key serrations detecting convex portion into one of said grooves of said key holder;

at least one slide member disposed on said base and having concave portions corresponding to the sizes of the key serrations defined at regular intervals thereon in its sliding direction, the slide amount of said slide member varying in accordance with the sizes of the key serrations;

said at least one key serrations detecting member being arranged and interconnected with said at least one slide member so that pivotal movement of said at least one key serrations detecting member causes sliding of said at least one slide member;

a plurality of push levers, corresponding to respective concave portions of said slide member, each said push lever being resiliently urged by spring means and positioned so that a particular one of said push levers is inserted into its corresponding concave portion of said slide member in accordance with the slide amount thereof;

a plurality of first push members corresponding to respective said push levers and being interconnected respectively to said push levers;

a plurality of lock plates support members securely mounted on said base at positions respectively corresponding to said first push members for supporting thereon lock plates of different sizes;

said first push members being positioned to push said lock plates from said lock plates support members;

an elevating member having a plurality of lock plate receiving grooves corresponding to the lock plates receiving openings of the key cylinder, the lock plates pushed out by said first push members being sequentially inserted into said lock plates receiving grooves; and a plurality of second push members operated by a drive means and inserted into respective lock plate receiving grooves of said elevating member from one end thereof for inserting the lock plates placed in regular order in said lock plates receiving grooves into the lock plate receiving openings of a key cylinder held at the other end thereof.

2. A lock plates inserting machine as claimed in claim 1, further comprising a cam mechanism means for moving said key holder together with said elevating member up and down, and wherein the key serrations vertically disposed in the grooves of said key holder are sequentially detected by said at least one key serrations detecting member through vertical movement of said key holder by said cam mechanism means and the lock plate corresponding to respective key serrations are sequentially inserted into the lock plate receiving grooves vertically defined in said elevating member through said slide member.

3. A lock plates inserting machine as claimed in claim 1, wherein said at least one key serrations detecting member is so designed that its convex portion and its contact portion on the side of said slide member are disposed in a high ratio with respect to the fulcrum of said base and said slide member is caused to slide in said predetermined ratio in compliance with the sizes of the key serrations.

4. A lock plates inserting machine as claimed in claim 1, wherein said push levers are disposed at intervals different from the intervals between said concave portions of said slide member by degrees in accordance with the slide amounts corresponding to the sizes of said key serrations and only one of said push levers corresponding to one of said key serrations is inserted into one of said concave portions corresponding thereto so that the lock plate suitable for the size of one of said key serrations is inserted into said elevating member by said one of first push members.

5. A method of inserting lock plates for key cylinder, wherein the lock plates respectively corresponding to serrations of a key are inserted into a plurality of lock plate receiving openings defined at regular intervals on a key cylinder in the axial direction thereof, said method comprising the steps of:

inserting the key into a key holder;

inserting a key serrations detecting convex portion formed on a key serrations detecting member into one of a plurality of grooves defined in said key holder for detecting the key serrations so as to operate said key serrations detecting member in accordance with the size of one of the key serrations, said key serrations detecting member being resiliently urged by a spring;

sliding a slide member in response to the operation of said key serrations detecting member;

inserting one of a plurality of push levers corresponding to the size of one of said key serrations into a corresponding one of a plurality of concave portions formed on said slide member, a plurality of first push members being operated respectively by said plurality of push levers, each of said plurality of first push members being urged by respective springs and so disposed as to correspond to respective concave portions of said slide member;

providing support members for holding different size lock plates;

pushing out, by one of said plurality of first push members, one of said lock plates corresponding to the size of said one of the key serrations and supported by one of said support members;

inserting said lock plate into one of a plurality of grooves defined in an elevating member and corresponding to the number of lock plate receiving openings defined in said key cylinder by continued pushing motion of said first push member;

inserting a plurality of required lock plates into respective grooves of said elevating member in accordance with the sizes and alignment of said key serrations by repeating the aforementioned operation; and inserting required lock plates into corresponding lock plate receiving openings of said key cylinder disposed at one end of said elevating member by simultaneously inserting a plurality of second push members into respective grooves of said elevating member from the other end thereof so as to advance the lock plates together with said second push members within said elevating member.

* * * * *